UNITED STATES PATENT OFFICE 2,645,634

SULFURIZED COMPOUNDS OF THE DIANTHRONE ETHYLENE SERIES AND PROCESS FOR MAKING THE SAME

Emil Schwamberger, Frankfurt am Main Fechenheim, Germany, assignor to Cassella Farbwerke Mainkur Aktiengesellschaft, Frankfurt am Main Fechenheim, Germany, a company of Germany No Drawing. Application September 22, 1951, Serial No. 247,908. In Germany October 4, 1950

9 Claims. (Cl. 260—131)

This invention relates to vat dyestuffs containing sulfur and a process of making same.

It is known to manufacture vat dyestuffs from reaction products of anthrones with glyoxal by means of alkaline condensing agents, according to German patent specification 470,501. Such dyestuffs have shades ranging from red to violet and contain probably a dianthrone ethylene structure

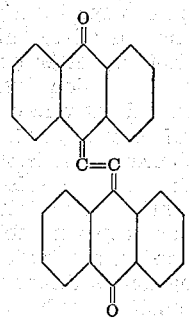

It is further known to transform these dyestuffs in a melt of aluminium chloride and alkali chloride (see German patent specification 550,712) into dyestuffs termed "acedianthrones." These dyestuffs dye red-brown shades from yellow-brown vats. The color of their solution in concentrated sulfuric acid usually is violet blue to pure blue.

It has now been found that new vat dyestuffs are obtained by treating the above red to violet vat dyestuffs of the dianthrone ethylene series with sulfur, sulfur halides and/or halides of sulfurous acid in the presence of aluminium chloride or bromide or halides of other trivalent metals customary for the Friedel-Crafts reaction. Besides the dianthrone ethylene itself the substitution products of dianthrone ethylene, e. g. its halogen, methyl or phenyl derivatives, may be used as starting materials.

Depending on the reaction temperature and the use of the above mentioned reacting agents, there are obtained dyestuffs of shades ranging from yellow-brown, yellow-olive to yellowish green, in all of them sulfur being a constituent of the molecule. As further characteristics of this new dyestuff group may be named the color of their vats, ranging from red- to brown-violet, and the color of their solutions with concentrated sulfuric acid, ranging from rubine red to red-violet. The constitution is not yet known.

The dyestuffs are formed at very low temperatures, e. g. there is a dyestuff of a green shade obtained at 0° C., when treating dianthrone ethylene with a solution of aluminium chloride and a small quantity of sulfur chloride in thionyl chloride.

As the agents employed, such as sulfur chloride and thionyl chloride, in many instances have a chlorinating effect, which under some circumstances is further increased by the catalytic action of ferric chloride when present, there are formed at elevated temperatures members of the new dyestuff class which contain more or less chlorine. Their shades tend toward yellow-olive as the content of chlorine increases. From the mixtures thus formed the single components may be segregated by known methods, e. g. by fractional crystallisation from high-boiling solvents or from concentrated sulfuric acid. The pure products thus obtained are vat dyestuffs of outstanding fastness to light and excellent other fastness properties. The crude mixtures also represent products of very valuable dyeing properties. Further improvements in shade and fastness properties may be achieved in certain cases by an aftertreatment, e. g. with sodium hypochlorite liquor. The new dyestuffs are also very suitable for textile printing and have no detrimental effect upon the cotton fiber on exposure to light.

The manufacture of the dyestuffs may be carried out in different ways: when working at low temperatures it is useful to dissolve the aluminium chloride in thionyl chloride or sulfur chloride. In many instances a favorable effect has been obtained by adding small quantities of sulfur chloride to the thionyl chloride, because thereby the reaction is accelerated and side reactions are suppressed so that dyestuffs of a purer shade are obtained.

When working at elevated temperatures, in which case usually derivatives are obtained which contain chlorine, molten aluminium chloride may be used and the melting point may also be lowered by the needed halides of sulfur or sulfurous acid, by the means generally known for reducing the melting point of an aluminium chloride melt, e. g. by addition of alkali chlorides, alkali bisulfites or gaseous sulfurous acid. It is also possible, in particular when working at elevated temperatures, to use elementary sulfur instead of the halides of sulfur or sulfurous acid, or those sulfur compounds which under the conditions of the aluminium chloride melt release sulfur, e. g. sodium sulfide. This latter variation of the procedure further offers the possibility to use sulfur compounds which at the same time effect a reduction of the melting point of the aluminium chloride melt, e. g. sodium hydrosulfite from which both sulfur and sulfurous acid are set free.

By varying the conditions of the reactions, not only the content of halogen but also the content of sulfur is modified. Instead of the chlorides of sulfur or sulfurous acid, other halogen derivatives may be employed, e. g. thionyl bromide. The aluminium chloride may also be replaced by aluminium bromide. Furthermore the reaction may be conducted in such a way that by operating first with a smaller quantity of sulfur or halides of sulfur and/or of sulfurous acid, a primary condensation product is formed which as an intermediate is further halogenated or sulfurised by adding further agents of the above described kind, eventually with raising the temperature. Catalytic effects may also be involved, e. g. when replacing the aluminium chloride by ferric chloride.

It is also possible to carry out the process in the presence of an organic solvent, e. g. carbon tetrachloride.

The following examples, in which the parts are parts by weight, are given by way of illustration and not in limitation of this invention.

*Example 1*

To a mixture of 100 parts of anhydrous aluminium chloride, 100 parts of thionyl chloride and 1 part of sulfur chloride there are added, at 20–25° C., whilst cooling, 10 parts of the dianthrone ethylene obtained according to German patent specification 470,501, followed by stirring until a sample, when poured on water, produces an olive-green precipitation (about 4–5 hours required for stirring).

After pouring on ice, a dyestuff is obtained which dyes olive shades and contains sulfur. The color of solution with concentrated sulfuric acid is red-violet, the vat also has a red-violet color.

When working without the addition of sulfur chloride, a dyestuff of a brown shade is obtained which contains sulfur.

*Example 2*

To a mixture of 100 parts of aluminium chloride and 100 parts of sulfur chloride there are added at room temperature (20–25° C.) 25 parts of the dichlorodianthrone ethylene obtained from 2-chloranthrone according to German patent specification 470,501 followed by stirring for 3 hours. After destroying excess sulfur chloride by means of a solution of sodium carbonate or alcohol, a dyestuff is obtained which dyes cotton from a violet vat yellowish olive shades.

*Example 3*

100 parts of aluminium chloride, which as far as possible should contain no iron, are dissolved in 110 parts of thionyl chloride at about 50° C., after adding 3 parts of sulfur chloride, the solution being cooled to 0° to +5° C. Whilst cooling with ice 10 parts of the starting material used in Example 2 are slowly added, so that the temperature remains below 5° C. The mix is then stirred at 0°–5° C. for about 4 hours. After pouring onto ice, a vat dyestuff is obtained which dyes pure yellowish green shades of excellent fastness properties. By recrystallising the dyestuff, e. g. from o-dichlorobenzene, a product is obtained which dyes shades of a still improved purity. The product contains about 6–7% of sulfur and 13–14% of chlorine. The color of the vat is violet and the solution with concentrated sulfuric acid is red-violet in color.

When in the present example the quantity of thionyl chloride is increased to 120 parts and the reaction mixture is kept at a temperature of −5° to −10° C., there is also obtained a dyestuff of a clear yellow-green shade.

When replacing in the above Example 3 the dichlorodianthrone ethylene by the unsubstituted dianthrone ethylene obtained according to German patent specification 470,501, and otherwise proceeding according to the description given in paragraph 1, a somewhat more bluish green vat dyestuff of excellent fastness properties is obtained. The product contains about 6.5% of sulfur and a small percentage of chlorine.

*Example 4*

10 parts of the dichlorodianthrone ethylene obtained from 1-chloranthrone are added at 0° to +5° C. to a mixture of 120 parts of thionyl chloride, 100 parts of anhydrous aluminium chloride and 3 parts of sulfur chloride, the subsequent treatment being carried out as described in Example 3. An olive-green dyestuff is obtained.

*Example 5*

To a melt of 100 parts of anhydrous aluminium chloride, 16 parts of rock salt and 25 parts of thionyl chloride there are added, at 70–75° C., 5 parts of dianthrone ethylene (obtained according to German patent specification 470,501, Example 1). The mass is stirred at this temperature for several hours. After pouring onto ice, a dyestuff is obtained which dyes the vegetable fibre from a violet-red vat yellowish olive shades. The crude dyestuff may be purified by recrystallising from nitrobenzene. It is then obtained in the form of black-green crystals, which dissolve in concentrated sulfuric acid with a rubine-red color. The product contains chlorine and sulfur. It dyes cotton from a hydrosulfite vat fast olive shades, being somewhat more greenish than those of the non-purified product.

*Example 6*

To the melt obtained according to Example 5, there are added at 70–75° C., 5 parts of the 2,2'-dichlorodianthrone ethylene obtained from 2-chloranthrone according to German patent specification 470,501, Example 2. The mass is then stirred for several hours. The dyestuff obtained by pouring onto ice is recrystallised from nitrobenzene. From the nitrobenzene solution black-green crystals are obtained which dissolve in concentrated sulfuric acid with a rubine-red color. The new dyestuff, which contains chlorine and sulfur, dyes cotton from a violet-red vat yellowish olive shades of an excellent fastness to light and good resistance to soda-boiling and chlorine. From the nitrobenzene filtrate there separates, after standing for an appreciable length of time, another dyestuff dyeing cotton from a brown-violet vat yellow-brown shades which also have good fastness properties. This product dissolves in sulfuric acid with a red-violet color. It contains less chlorine but a greater amount of sulfur than the first described green dyestuff.

*Example 7*

20 parts of the 2,2'-dichloro-dianthrone ethylene as employed in Example 6 are added, at 60–65° C., to a melt of 100 parts of aluminium chloride, 70 parts of thionyl chloride and 1 part of sulfur chloride. After several hours the melt is poured onto ice. The dyestuff thus obtained dyes cotton and related fibres from a red-violet vat yellowish olive shades with excellent fastness properties.

By recrystallisation from nitrobenzene or fractional precipitation from concentrated sulfuric acid, products are obtained from the crude dyestuff which contain 5–6% of sulfur and 25–30% of chlorine and are dyeing shades of a still greater fastness.

*Example 8*

5 parts of a dichlorodimethyl-dianthrone ethylene, obtained from the anthrone derived from 3'-chloro - 4' - methylbenzophenone-2-carboxylic acid by known methods are added at 70–75° C. to a melt of 80 parts of aluminium chloride, 14 parts of sodium chloride and 22 parts of thionyl chloride. After several hours the melt is worked up.

The dyestuff thus obtained dyes cotton from a red-violet vat rather greenish yellow-olive shades.

A dyestuff of a similar shade is obtained when treating, in the same manner as here described, the tetrachlorodianthrone ethylene obtained from 2,6-dichloroanthrone.

*Example 9*

100 parts of aluminium chloride, 10 parts of rock salt and 5 parts of potassium chloride are liquefied by introducing gaseous sulfurous acid at 60–65° C. Then 20 parts of thionyl chloride and 10 parts of the starting material employed in Example 6 are added, followed by stirring for several hours at 60–65° C. After pouring onto ice, a dyestuff is obtained which dyes from a red-violet vat a yellowish olive green shade of good fastness properties.

*Example 10*

A mixture of 150 parts of thionyl chloride, 1 part of sulfur chloride, 10 parts of ferric chloride and 5 parts of the dianthrone ethylene obtained from 2-chloranthrone according to German patent specification 470,501, is heated gradually from room temperature to 60–70° C. whilst stirring, accompanied by a change of color of the melt from green to violet-red. After removing the thionyl chloride in excess, which for example may be accomplished by vacuum distillation or by pouring the melt into alcohol, a product is obtained which dissolves in concentrated sulfuric acid with a violet-red color, produces a violet-red colored vat and dyes cotton yellowish olive shades.

*Example 11*

To a melt of 80 parts of aluminium chloride, 20 parts of ferric chloride, 60 parts of thionyl chloride and 1 part of sulfur chloride there are added at 50–55° C., 10 parts of the starting material employed in Example 10, followed by stirring for several hours at 50–55° C. After pouring onto ice and hydrochloric acid, a product is obtained which contains sulfur and dyes cotton from a red-violet vat yellowish olive green shades.

*Example 12*

A mixture of 100 parts of aluminium chloride, 1 part of sulfur and 16 parts of rock salt is liquefied by introducing gaseous sulfurous acid at 60–65° C. Then 5 parts of the dichlorodianthrone ethylene obtained from 2-chloranthrone according to German patent specification 470,501 are added, followed by stirring at 60° C. for a length of time until a sample produces an olive-green precipitation when poured on water. After pouring the melt onto ice, a dyestuff is obtained which dyes cotton from a red-violet vat yellowish olive green shades having good fastness properties. The product dissolves in concentrated sulfuric acid with a red-violet color.

*Example 13*

To a melt prepared of 100 parts of aluminium chloride and 16 parts of rock salt by means of sulfurous acid at 60–65° C., there is added by portions a mixture of 10 parts of the starting material employed in Example 12 and 5 parts of anhydrous sodium sulfide, followed by stirring for several hours. After pouring onto ice, a product is obtained which dyes the vegetable fibre olive-brown shades. The dyestuff contains sulfur. It dissolves in concentrated sulfuric acid with a red violet color, and the vat is colored wine-red.

*Example 14*

A mixture of 80 parts of aluminum chloride and 20 parts of sodium hydrosulfite is liquefied by heating carefully at 65–70° C. Then 5 parts of the dichlorodianthrone ethylene, as employed in Example 12, are added and the mixture is stirred for several hours at 65–70° C. After pouring onto ice, a dyestuff-paste is obtained which, after filtering by suction and washing, is liberated from free sulfur by stirring at 80° C. with a solution of 5 parts of sodium sulfite in 100 parts of water. This dyestuff dyes the vegetable fibre from a violet vat covered olive shades. The molecule of the product obtained contains sulfur. The color of solution with concentrated sulfuric acid is red-violet.

I claim:

1. Process which comprises treating a vat dyestuff of the dianthrone ethylene series, having the formula

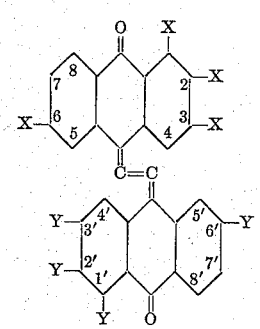

wherein X is a member of the group consisting of hydrogen, alkyl and halogen and each Y is identical with the corresponding X of the same position in the other anthraquinone nucleus, with a condensing agent of the group customary for the Friedel-Crafts reaction and consisting of the chlorides and bromides of aluminium and iron and with sulfurising agents of the group consisting of sulfur, alkali salts and halides of sulfurous acid, alkali sulfides, alkali hydrosulfites, sulfur chlorides.

2. Process according to claim 1 wherein the treating agents are aluminium chloride, thionyl chloride and sulfur chloride, and the treatment is effected at temperatures ranging from 0° C. to 65° C.

3. Process which comprises condensing dianthrone ethylene with a solution of aluminium chloride, thionyl chloride and sulfur chloride at a temperature ranging between 0° C. and 5° C.

4. Process which comprises condensing dichloro-dianthrone ethylene of the formula

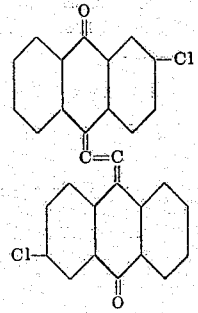

with a solution of aluminium chloride, thionyl chloride and sulfur chloride at a temperature ranging between 0° C. and 5° C.

5. Process which comprises condensing dichloro-dianthrone ethylene of the formula with a mixture of aluminium chloride, thionyl chloride and sulfur chloride at a temperature ranging from 60–65° C.

6. As new compounds the vat dyestuffs prepared by the process of claim 1.

7. As new compounds the vat dyestuffs prepared by the process of claim 3.

8. As new compounds the vat dyestuffs prepared by the process of claim 4.

9. As new compounds the vat dyestuffs prepared by the process of claim 5.

EMIL SCHWAMBERGER.

References Cited in the file of this patent

UNITED STATES PATENTS

| Number | Name | Date |
|---|---|---|
| 2,073,022 | Mieg et al. | Mar. 9, 1937 |
| 2,096,688 | Schlyer et al. | Oct. 19, 1937 |
| 2,369,668 | Fox | Feb. 20, 1945 |

FOREIGN PATENTS

| Number | Country | Date |
|---|---|---|
| 566,472 | Germany | December 1932 |